(12) United States Patent
Shimokawa (10) Patent No.: US 8,607,944 B2
(45) Date of Patent: Dec. 17, 2013

(54) SHOCK-ABSORBING STRUCTURE

(75) Inventor: Shinnosuke Shimokawa, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 563 days.

(21) Appl. No.: 12/700,772

(22) Filed: Feb. 5, 2010

(65) Prior Publication Data
US 2010/0200346 A1 Aug. 12, 2010

(30) Foreign Application Priority Data

Feb. 10, 2009 (JP) ................................. 2009-028555

(51) Int. Cl.
*F16F 7/10* (2006.01)
(52) U.S. Cl.
USPC ............................................. 188/378; 267/81
(58) Field of Classification Search
USPC ......... 188/378–380; 267/151–153, 140.4, 87, 267/85, 81, 292, 284, 142–146
See application file for complete search history.

(56) References Cited

U.S. PATENT DOCUMENTS

| 3,432,127 A * | 3/1969 | Philipp ........................ 267/153 |
| 3,601,935 A * | 8/1971 | Cadwell ....................... 89/36.04 |
| 4,890,877 A | 1/1990 | Ashtiani-Zarandi et al. |
| 6,854,721 B2 * | 2/2005 | Kato et al. .................. 267/140.4 |
| 2007/0221460 A1 * | 9/2007 | Guo et al. ..................... 188/378 |
| 2008/0258366 A1 * | 10/2008 | Tuttle ........................... 267/158 |

FOREIGN PATENT DOCUMENTS

| JP | 2-80824 | 3/1990 |
| JP | 2000-179602 | 6/2000 |
| JP | 2001-208120 | 8/2001 |
| JP | 2003-139179 | 5/2003 |
| JP | 2005-193755 | 7/2005 |

* cited by examiner

*Primary Examiner* — Melanie Torres Williams
(74) *Attorney, Agent, or Firm* — Finnegan, Henderson, Farabow, Garrett & Dunner, LLP (57) ABSTRACT

A shock-absorbing structure configured to absorb an impact load in a specific direction includes a first steric portion having a hollow steric structure; and a second steric portion disposed inside the first steric portion and having a hollow steric structure. In the shock-absorbing structure, the second steric portion includes a wall portion along a direction crossing the specific direction.

5 Claims, 15 Drawing Sheets

SHOCK-ABSORBING STRUCTURE

INCORPORATION BY REFERENCE

The disclosure of Japanese Patent Application No. 2009-028555 filed on Feb. 10, 2009 including the specification, drawings and abstract is incorporated herein by reference in its entirety.

BACKGROUND OF THE INVENTION

1. Field of the Invention

The invention relates to a shock-absorbing structure for absorbing an impact load.

2. Description of the Related Art

A steric hollow tubular body having planes at an outer side surface is known as a shock-absorbing structure (see, for example, Japanese Patent Application Publication No. 2000-179602 (JP-A-2000-179602)). In such a shock-absorbing structure, an impact load applied in the axial direction (specific direction) is absorbed by self-collapse.

However, in the above-described shock-absorbing structure, although an impact load in a specific direction is absorbed, an impact load in the direction other than the specific direction sometimes cannot be absorbed. Therefore, high robustness is required in a loading direction of the impact load to be absorbed. Further, it is desirable that the absorption of the impact load could be controlled.

SUMMARY OF THE INVENTION

The invention provides a shock-absorbing structure that has high robustness in a loading direction of the impact load to be absorbed and that makes it possible to control the absorption of the impact load.

The first aspect of the invention relates to a shock-absorbing structure configured to absorb an impact load in a specific direction. This shock-absorbing structure includes a first steric portion having a hollow steric structure; and a second steric portion disposed inside the first steric portion and having a hollow steric structure, wherein the second steric portion includes a wall portion along a direction crossing the specific direction.

BRIEF DESCRIPTION OF THE DRAWINGS

The foregoing and further features and advantages of the invention will become apparent from the following description of example embodiments with reference to the accompanying drawings, wherein like numerals are used to represent like elements, and wherein.

DETAILED DESCRIPTION OF EMBODIMENTS

Embodiments of the invention will be described below in greater details with reference to the appended drawings. In the explanation below, like or corresponding elements will be denoted by like reference numerals and redundant explanation thereof will be omitted. The terms "up", "down", "left", and "right" are terms of convenience that are based on the state shown in the figured. For sake of convenience, the wall thickness in the figures is appropriately omitted.

Figure 1:
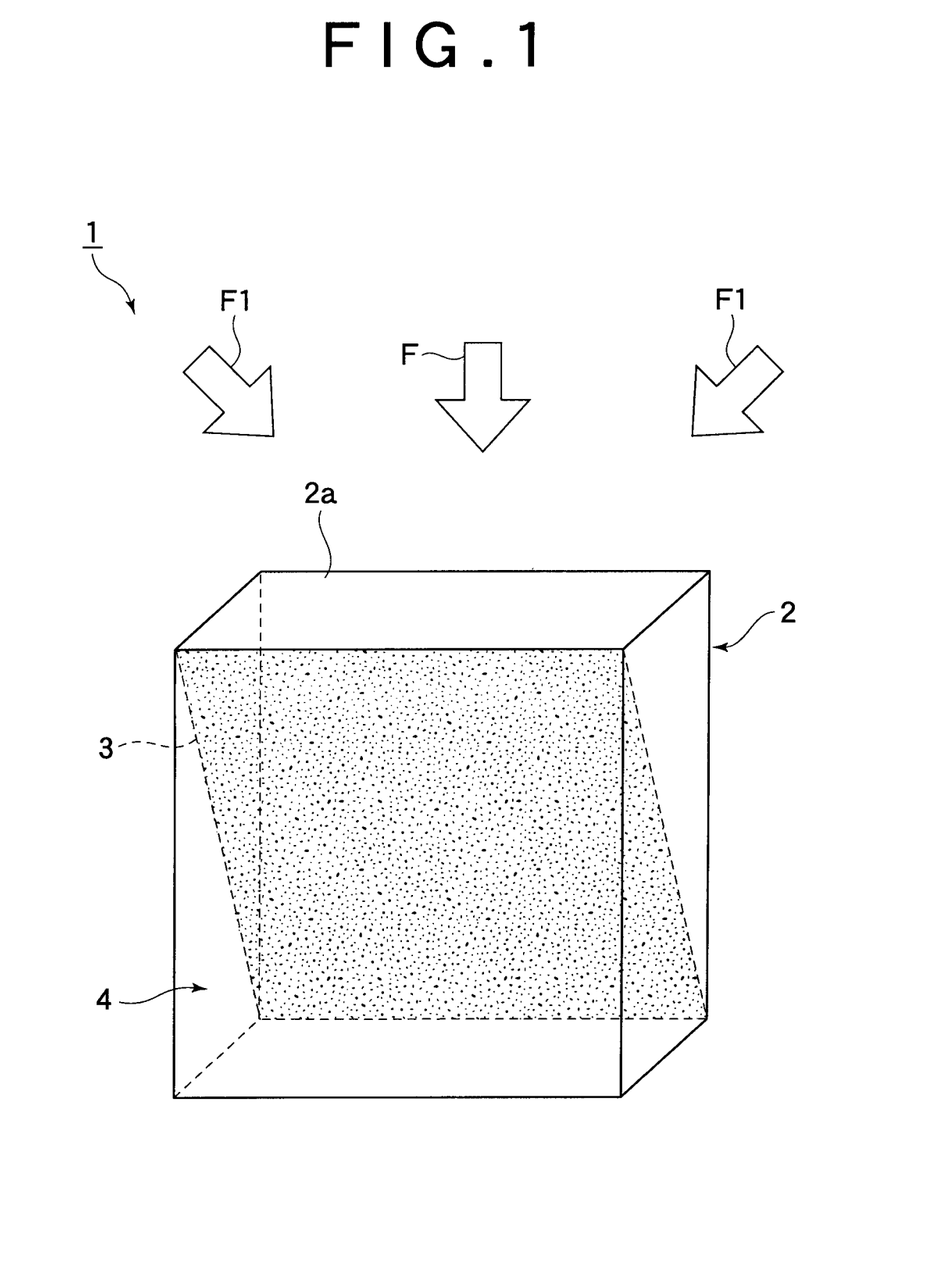
FIG. 1 is a schematic perspective view of a shock-absorbing structure of the first embodiment of the invention.
Figure 2A:
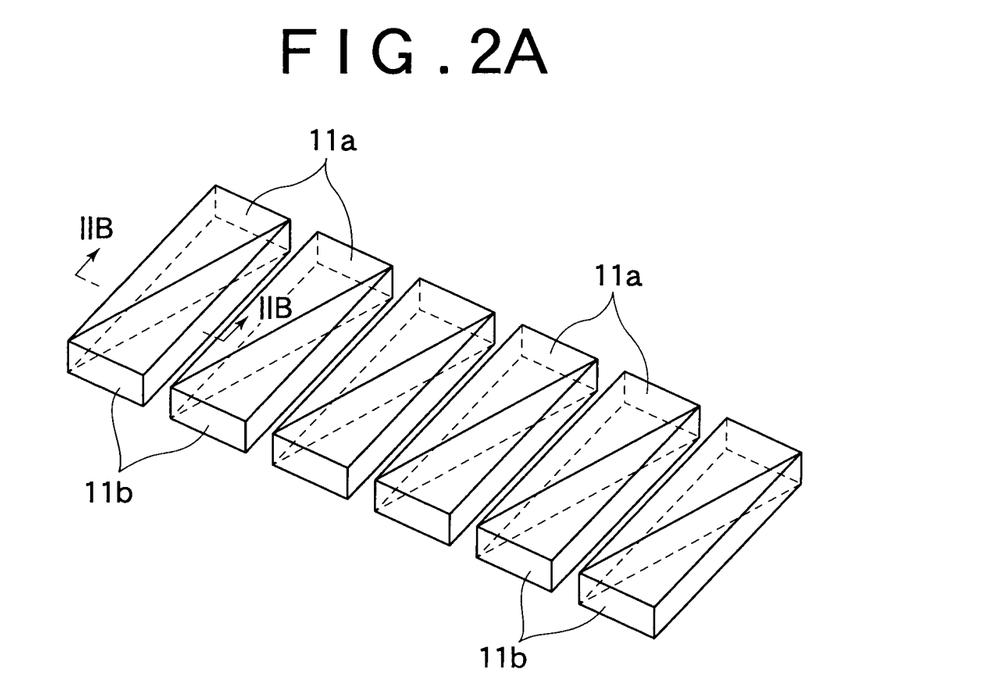
FIGS. 2A and 2B are explanatory drawings illustrating an example of a method for manufacturing the shock-absorbing structure shown in FIG. 1.
Figure 2B:
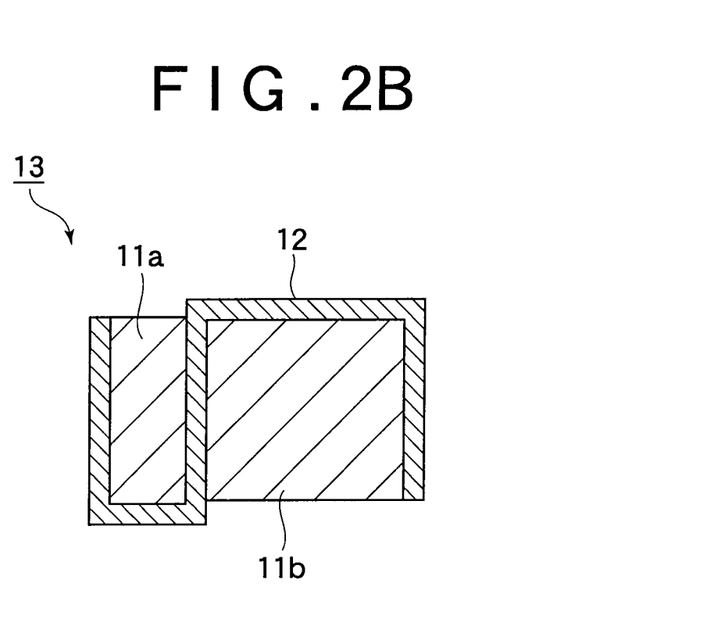

The first embodiment of the invention is described below. FIG. 1 is a schematic perspective view of a shock-absorbing structure of the first embodiment of the invention. FIGS. 2A and 2B are a cross-sectional view of the shock-absorbing structure shown in FIG. 1.

As shown in FIG. 1, the shock-absorbing structure 1 of the present embodiment absorbs an impact load (impact force) generated, for example, by collision, and is disposed and used so as to absorb an impact load F in a specific direction that is the direction from the top downwards, as shown in the figure. The shock-absorbing structure 1 can be applied to impact-resistant structures or entire structures in airplanes, automobiles, ships and high-speed motorways relating to composite structural bodies.

The shock-absorbing structure 1 has a thin-plate structure of a predetermined thickness formed, for example, from Carbon Fiber Reinforced Plastics (CFRP). The shock-absorbing structure 1 includes a first steric portion 2 that is a hollow polyhedral structure (steric structure). The first steric portion 2 of this embodiment has a cubic outer shape.

A wall portion 3 extending in the direction crossing the specific direction (in this embodiment, a direction inclined at 45° with respect to the specific direction) is formed inside the first steric portion 2. More specifically, the wall portion 3 extends so as to divide the first steric portion 2 along a diagonal from an upper wall portion 2a to a lower wall portion 2b of the first steric portion 2. As a result, the shock-absorbing structure 1 is provided with a second steric portion 4 that is a hollow steric structure formed (disposed) inside the first steric portion 2 and including a wall portion 3 along the direction crossing the specific direction.

A method for manufacturing the shock-absorbing structure 1 will be described below with reference to FIGS. 2A to 3. Here, a method for manufacturing a plurality of shock-absorbing structures 1 arranged side by side three-dimensionally will be explained by way of example.

First, as shown in FIG. 2A, core members composed, for example, of a polystyrene foam (45-fold foaming by a bead method) and having a rectangular parallelepiped shape are cut along a diagonal line to form core members 11a and 11b of a triangular prism shape. Then, as shown in FIG. 2B, a CFRP base material 12 is wound about the outer circumferential surface of the core members 11a and 11b. In his case, the CFRP base material 12 is wound in a wave-like shape so as to be introduced between the diagonal planes (the respective cutting planes) of the core members 11a and 11b. As a result, first intermediate bodies 13 are obtained.

Figure 3:
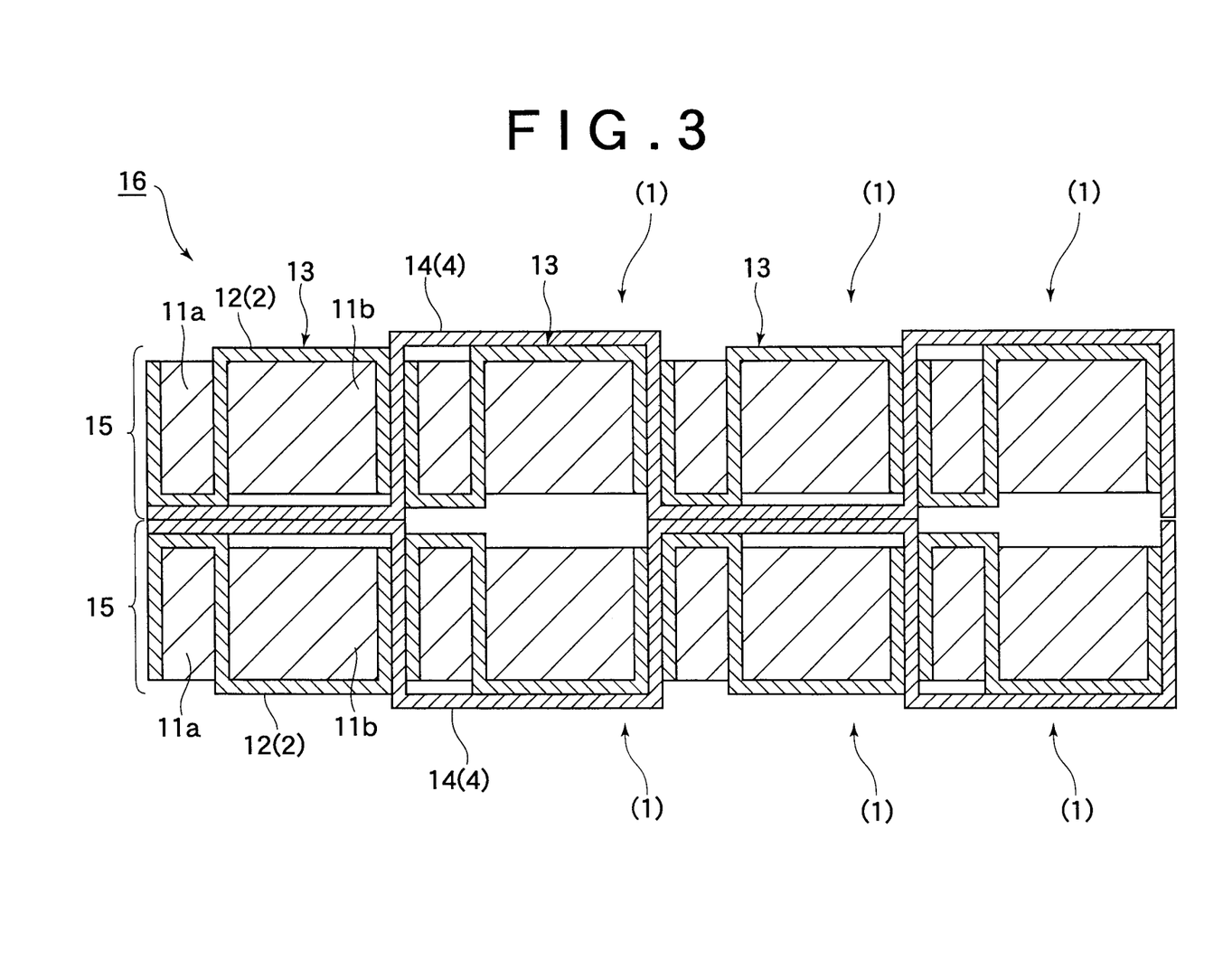
FIG. 3 is an explanatory drawing illustrating the continuation of the method for manufacturing the shock-absorbing structure shown in FIG. 2.

Then, as shown in FIG. 3, the first intermediate bodies 13 are disposed side by side, and a CFRP base material 14 is wound about the outer circumferential surface of these first intermediate bodies 13. In this case, the CFRP base material 14 is wound in a wave-like shape so as to be introduced between the adjacent first intermediate bodies 13, 13. As a result, second intermediate bodies 15 are obtained. A carbon/epoxy prepreg (W3101/Q112J: manufactured by Toho Tenax Co., Ltd.) is used as the CFRP base materials 12 and 14.

The second intermediate bodies 15 are then stacked to a obtain a stack 16. In this case, the second intermediate bodies 15 are stacked to obtain plane symmetry with respect to the stacking surface. The stack 16 is then inserted into a bag, and the bag is evacuated with a vacuum pump and loaded into a thermostat. The stack 16 is semicured by prefiring for 5 h at a temperature of 80° C. inside the thermostat. Main firing is then conducted for 1.5 h at 130° C. inside the thermostat, the stack 16 is cured, and the core members 11a, 11b are reduced in volume. As a result, a shock-absorbing structure 1 is manufactured as a hollow structural body in which the CFRP base materials 12, 14 are formed as respective wall portions of the first and second steric portions 2, 4.

In the shock-absorbing structure 1 of the present embodiment, a double-wall structure is obtained in which the second steric portion 4 is provided inside a three-dimensional space inside the first steric portion 2, and the wall portion 3 of the second steric portion 4 can absorb not only an impact load F in a specific direction, as the conventional cylindrical shock-absorbing structure having the specific direction as an axial direction, but also impact loads F, F1 in multiple directions including the specific direction. Therefore, high robustness can be demonstrated in the load direction of the impact load F.

In addition, because a load can be dispersed by the second steric portion 4 and buckling can be delayed by the first and second steric portions 2, 4, shock absorption can be ensured with good volume efficiency, while maintaining a peak load. In other words, the absorption of impact loads F, F1 (collapse mode) can be controlled.

As a result, in the present embodiment, stable shock absorption can be ensured without selecting a load direction. Further, in the structure of the present embodiment, cells receiving the impact loads F, F1 are disposed three-dimensionally and can be said to enable the design of a shock absorption process adapted to human body tolerance.

Figure 4:
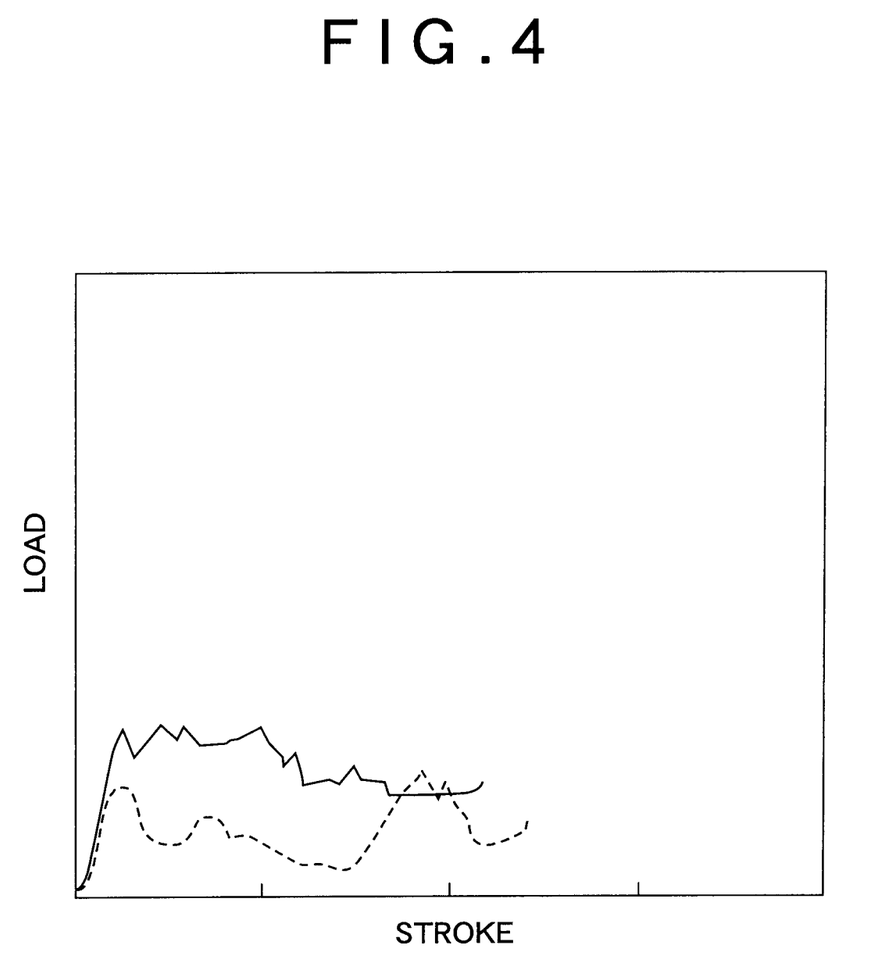
FIG. 4 is a graph showing the relationship between a load and a stroke in a case where an impact load is applied to the shock-absorbing structure shown in FIG. 1.

FIG. 4 is a graph showing the relationship between a load and a stroke in a case where an impact load is applied to the shock-absorbing structure shown in FIG. 1 and a shock-absorbing structure according to the related art. The stroke as referred to herein means a deformation amount of the shock-absorbing structure 1 (same hereinbelow). In the figure, a solid line shows values relating to the above-described shock-absorbing structure 1, and a broken line shows values relating to the shock-absorbing structure according to the related art that does not include the second steric portion 4. The graph shown in FIG. 4 demonstrates that in the shock-absorbing structure 1, the load does not drop abruptly although the stroke increases over that in the conventional structure, and the above-described effect of performing impact absorption with good volume efficiency, while maintaining a peak load, can be confirmed.

However, safety technology relating to aircraft crashes and automobile collisions is required for next-generation mobility. Accordingly, a shock-absorbing structure is needed that not only ensures a survival space, but also reduces G (acceleration) applied to a human body. Because the variety of collision states is infinite, the absorption of not only the impact load F in a specific direction, but also of impact loads F, F1 from various directions is desirable, and the possibility of controlling the load applied to a human body correspondingly to the impact load F, F1 is required.

However, within the framework of the related art, a structure is provided that receives the impact loads F, F1 mainly in a two-dimensional space. As a result, a shock absorption function is demonstrated with respect to the impact load F in a specific direction, but a sufficient impact absorption function sometimes cannot be demonstrated with respect to the impact load F1 applied from other directions. Therefore, the above-described effect of the present embodiment, that is, the possibility of absorbing impact loads F, F1 in multiple directions including the specific direction, can be said to be effective.

The second embodiment of the invention will be described below. In the explanation of the present embodiment, the features that are different from those of the above-described embodiment will be mainly described.

Figure 5:
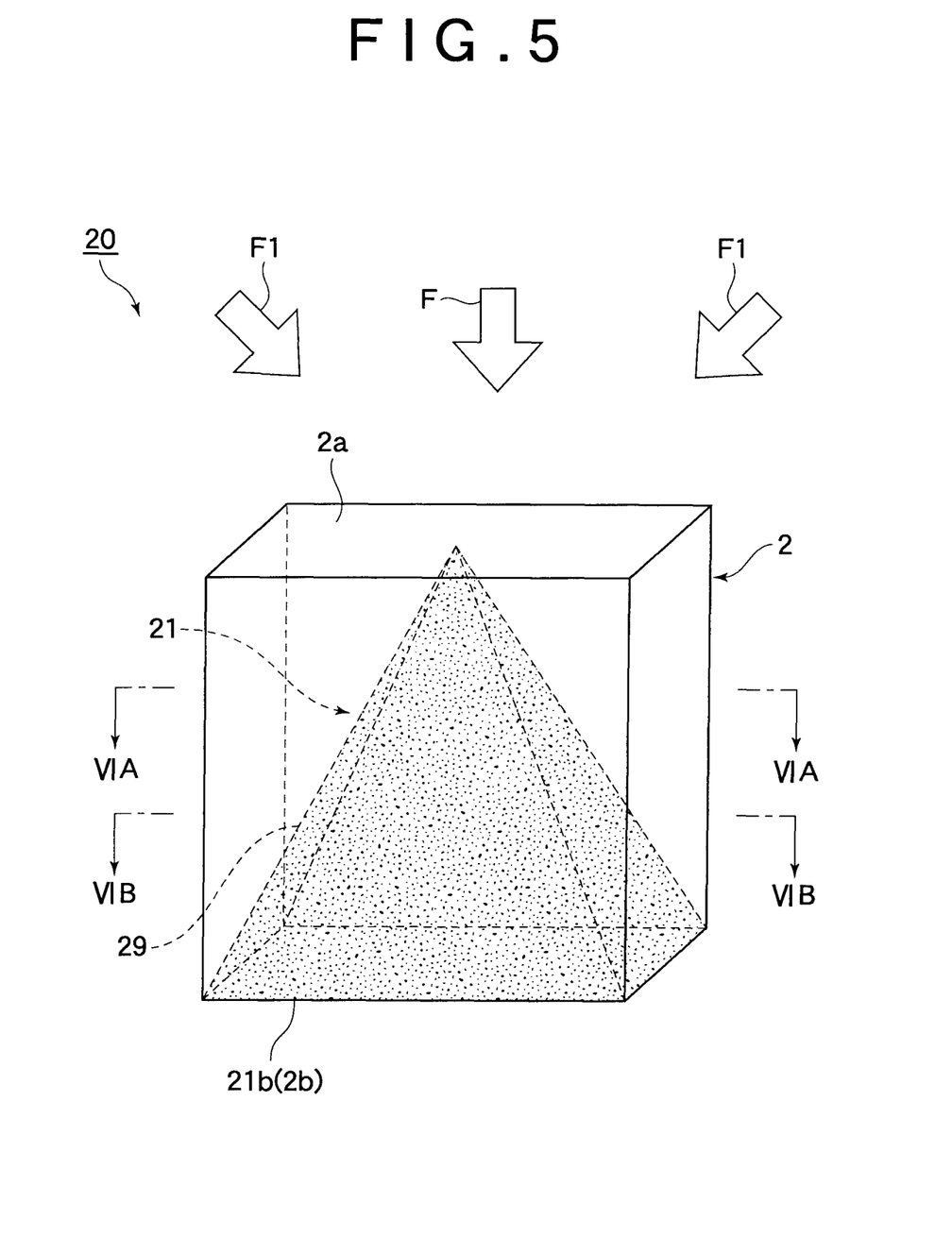
FIG. 5 is a schematic perspective view of a shock-absorbing structure of the second embodiment of the invention.
Figure 6A:
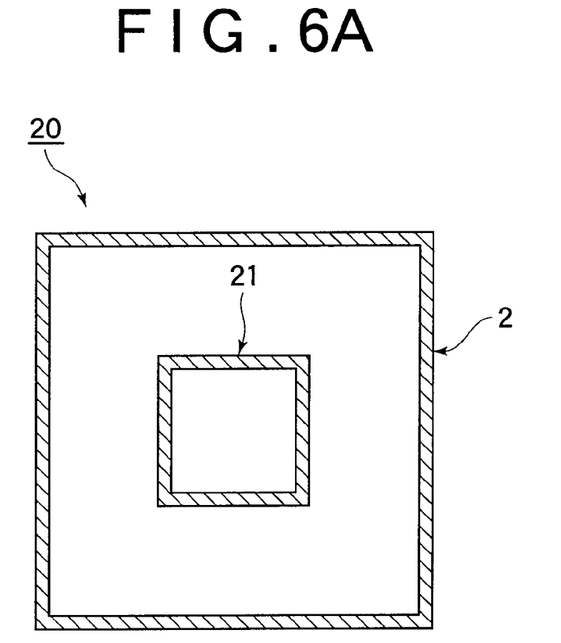
FIG. 6A is a cross-sectional view along the VIA-VIA line in FIG. 5.
Figure 6B:
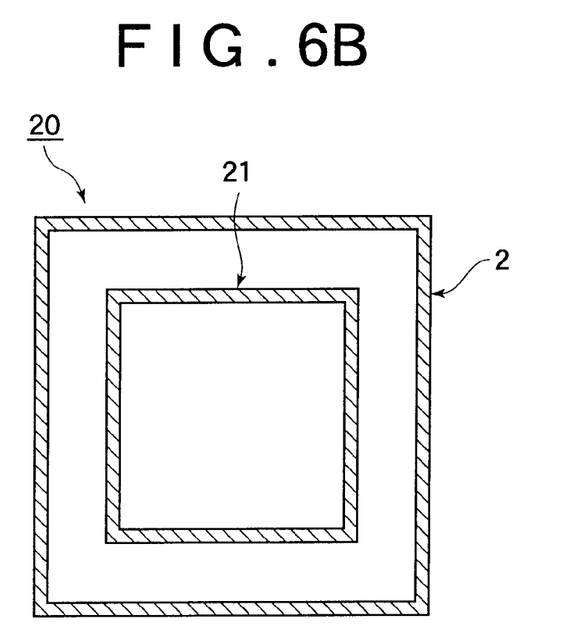
FIG. 6B is a cross-sectional view along the VIB-VIB line in FIG. 5.

FIG. 5 is a schematic perspective view of a shock-absorbing structure of the second embodiment of the invention. FIG. 6A and FIG. 6B are a cross-sectional view of the shock-absorbing structure shown in FIG. 5. As shown in FIG. 5, a shock-absorbing structure 20 of the present embodiment is different from the above-described shock-absorbing structure 1 in that a second steric portion 21 of a pyramidal outer shape is provided instead of the second steric portion 4 (see FIG. 1).

The second steric portion 21 has a tetragonal pyramidal outer shape in which a plane perpendicular to (crossing) a specific direction is a base plane 21b. In other words, the outer shape of the second steric portion 21 is a tetragonal pyramid for which the specific direction is a height direction. The second steric portion 21 is disposed so that an apex 21a thereof is positioned on the front side in the load direction (here, on an upper wall portion 2a) and the base plane 21b is positioned on the rear side in the load direction (here, a lower wall portion 2b).

As a result, as shown in FIG. 6A and FIG. 6B, the cross section area of the second steric portion 21 in the plane perpendicular to the specific direction increases with the transition from the front side in the load direction to the rear side in the specific direction. In other words, the second steric portion 21 is so configured that the cross section area thereof in a plane crossing the specific direction changes from one side to the other side in the specific direction (along the specific direction).

The above-described shock-absorbing structure 20 of the present embodiment is also configured so that the second steric portion 21 is provided inside the first steric portion 2 and the wall portion 29 of the second steric portion 21 extends along the direction crossing the specific direction. Therefore, the effect similar to the above described effect is demonstrated. Thus, the structure has high robustness in the load direction of the impact loads F, F1 that are to be absorbed and the absorption of the impact loads F, F1 is controlled.

Further, as described above, the second steric portion 21 is configured so that the cross section area thereof in a plane crossing the specific direction increases (changes) from one side to the other side in the specific direction. Therefore, because the cross section area thereof in a plane crossing the specific direction increases (changes) with the advance of self-collapse caused by the impact load F, the load is raised (changed) gradually and the shock absorption amount is increased (changed) gradually. In other words, the absorption of the impact load F can be further controlled to match human body tolerance.

Figure 7:
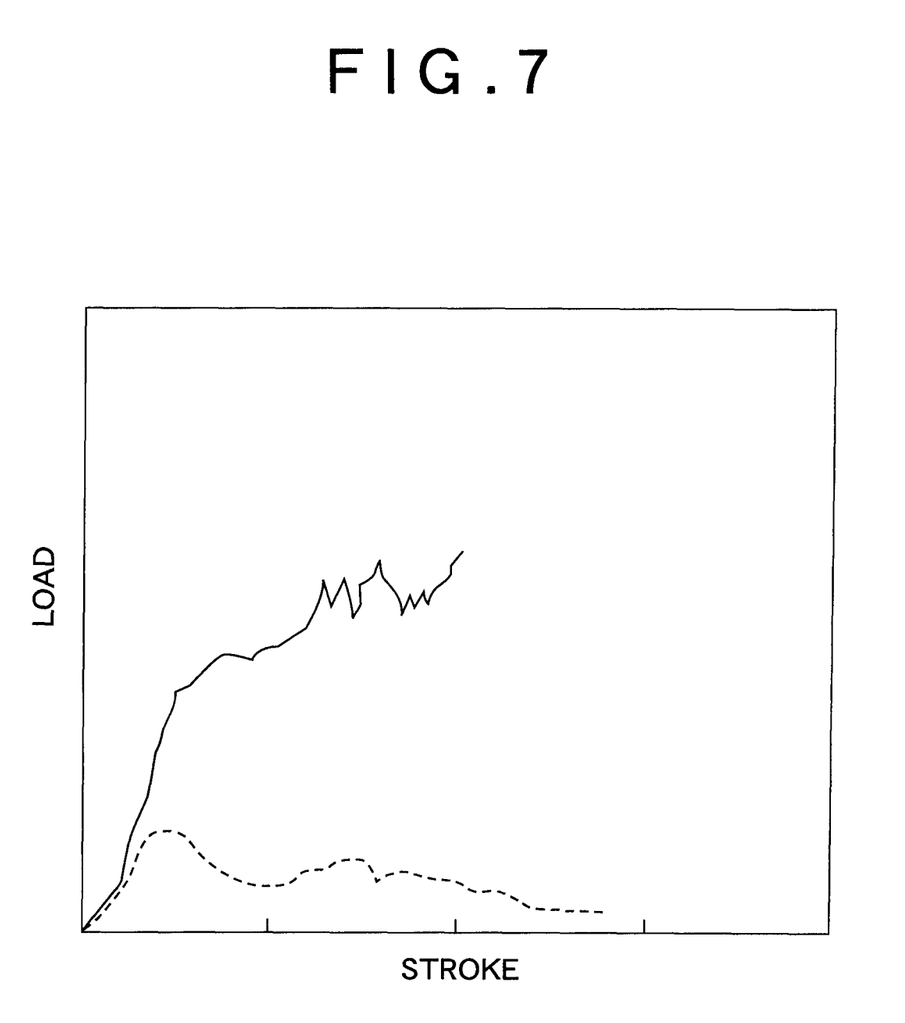
FIG. 7 is a graph showing the relationship between a load and a stroke in a case where an impact load is applied to the shock-absorbing structure shown in FIG. 5.

FIG. 7 is a graph showing the relationship between a load and a stroke in a case where an impact load is applied to the shock-absorbing structure shown in FIG. 5. In the figure, a solid line shows values relating to the above-described shock-absorbing structure 20, and a broken line shows values relating to the shock-absorbing structure according to the related art that does not include the second steric portion 21. The graph shown in FIG. 7 demonstrates that in the shock-absorbing structure 20, the load rises as the stroke increases over that in the conventional structure, and the above-described effect of gradually raising the load and gradually increasing the impact absorption amount can be confirmed.

In the present embodiment, similarly to the manufacturing method explained in the first embodiment, the shock-absorbing structure can be manufactured by winding a CFRP base material about core members divided so as to obtain a necessary outer shape, stacking, and curing.

Figure 8A:
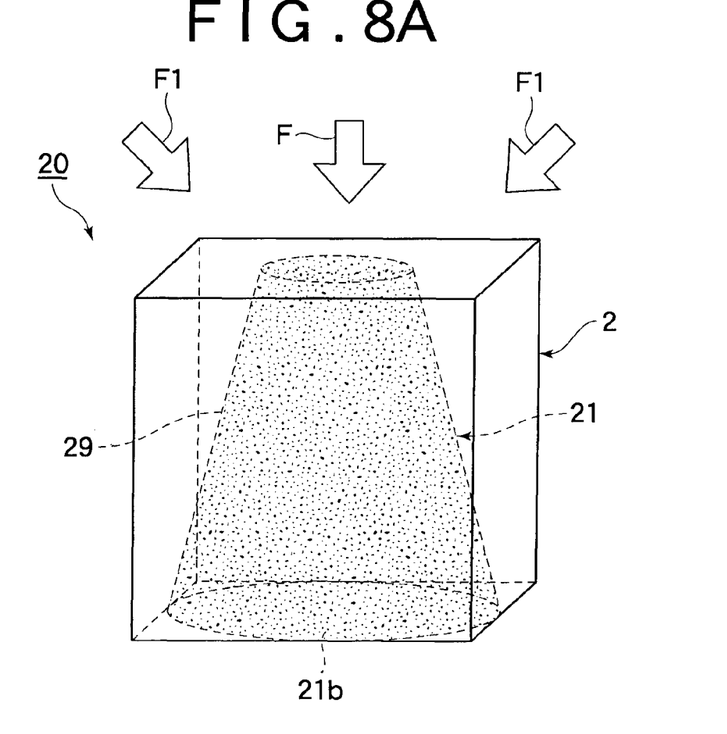
FIGS. 8A and 8B are schematic perspective views illustrating another example of the shock-absorbing structure shown in FIG. 5.
Figure 8B:
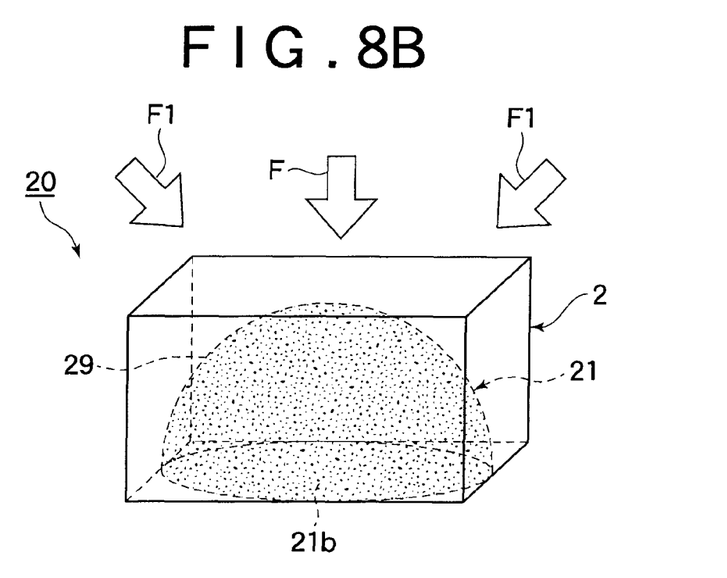

Further, in the present embodiment, the second steric portion 21 has a tetragonal pyramidal outer shape, but it may have one of a variety of pyramidal outer shapes such as a trigonal pyramidal outer shape or a conical outer shape. The second steric portion 21 may also have a truncated pyramidal outer shape, for example, a truncated conical outer shape such as shown in FIG. 8A. Furthermore, the second steric portion 21 may also have the outer shape of a spherical segment obtained by cutting a sphere along one plane, for example, a semi-spherical outer shape such as shown in FIG. 8B.

Further, in the present embodiment, the apex 21*a* of the second steric portion 21 is on the front side in the load direction and the base plane 21*b* is on the rear side in the load direction, but the apex 21*a* may be on the rear side in the load direction and the base plane 21*b* may be on the front side in the load direction. In this case, the cross section area in the plane crossing the specific direction decreases with the advance of self-collapse caused by the impact load F. Therefore, the load can be gradually reduced and the impact absorption amount can be gradually decreased.

Figure 9A:
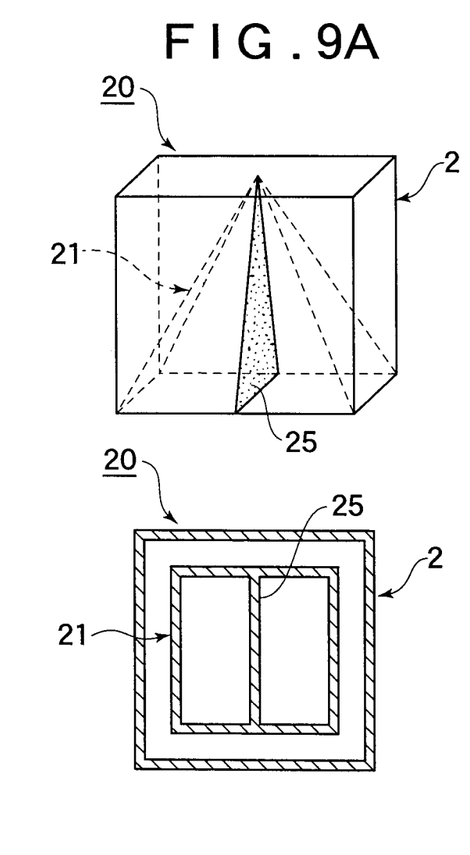
FIGS. 9A to 9C are schematic perspective views illustrating yet another example of the shock-absorbing structure shown in FIG. 5.
Figure 9B:
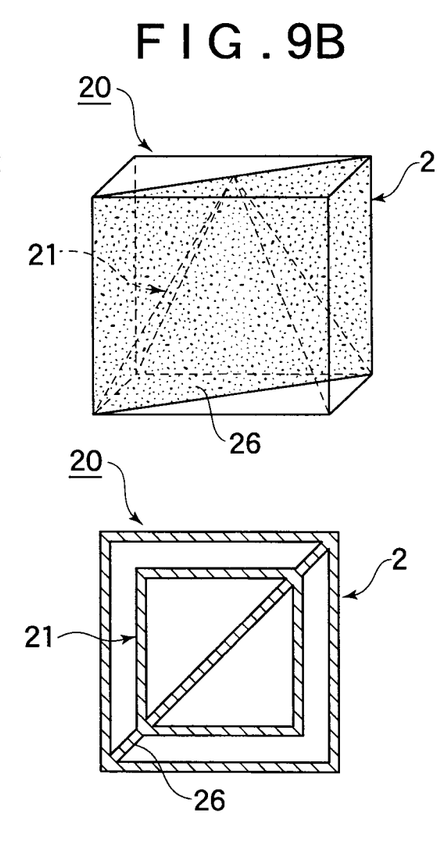
Figure 9C:
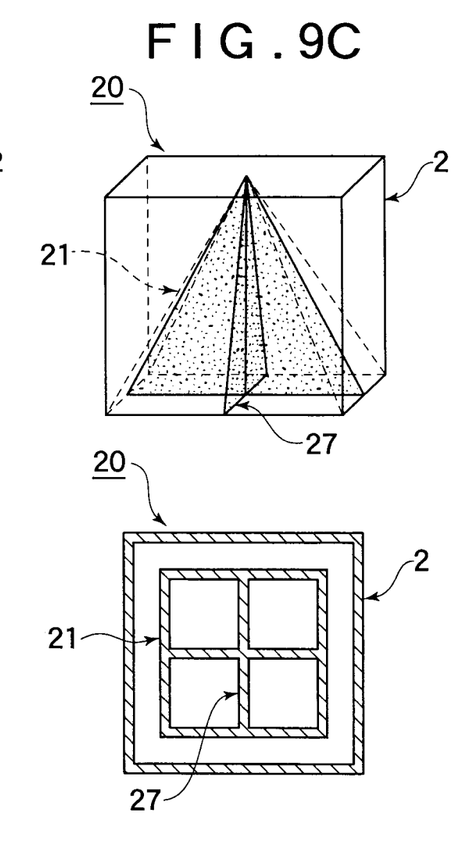

Incidentally, in the present embodiment, a reinforcing wall along the specific direction may be also provided inside the first steric portion 2 with the object of increasing the impact absorption amount. FIGS. 9A to 9C illustrate yet another example of the shock-absorbing structures shown in FIG. 5. The upper figure herein is a perspective view corresponding to FIG. 5, and the lower figure is a cross-sectional view corresponding to FIG. 6B.

As shown in FIG. 9A, a reinforcing wall 25 such that divides the second steric portion 21 into two equal portions may be provided inside the second steric portion 21. Further, as shown in FIG. 9B, a reinforcing wall 26 such that divides the first steric portion 2 into two equal portions along the diagonal may be provided inside the first steric portion 2. Further, as shown in FIG. 9C, a cross-shaped reinforcing wall 27 such that divides the second steric portion 21 into four equal portions may be provided inside the second steric portion 21.

The third embodiment of the invention will be explained below. In the explanation of the present embodiment, the features that are different from those of the above-described embodiment will be mainly described.

Figure 10:
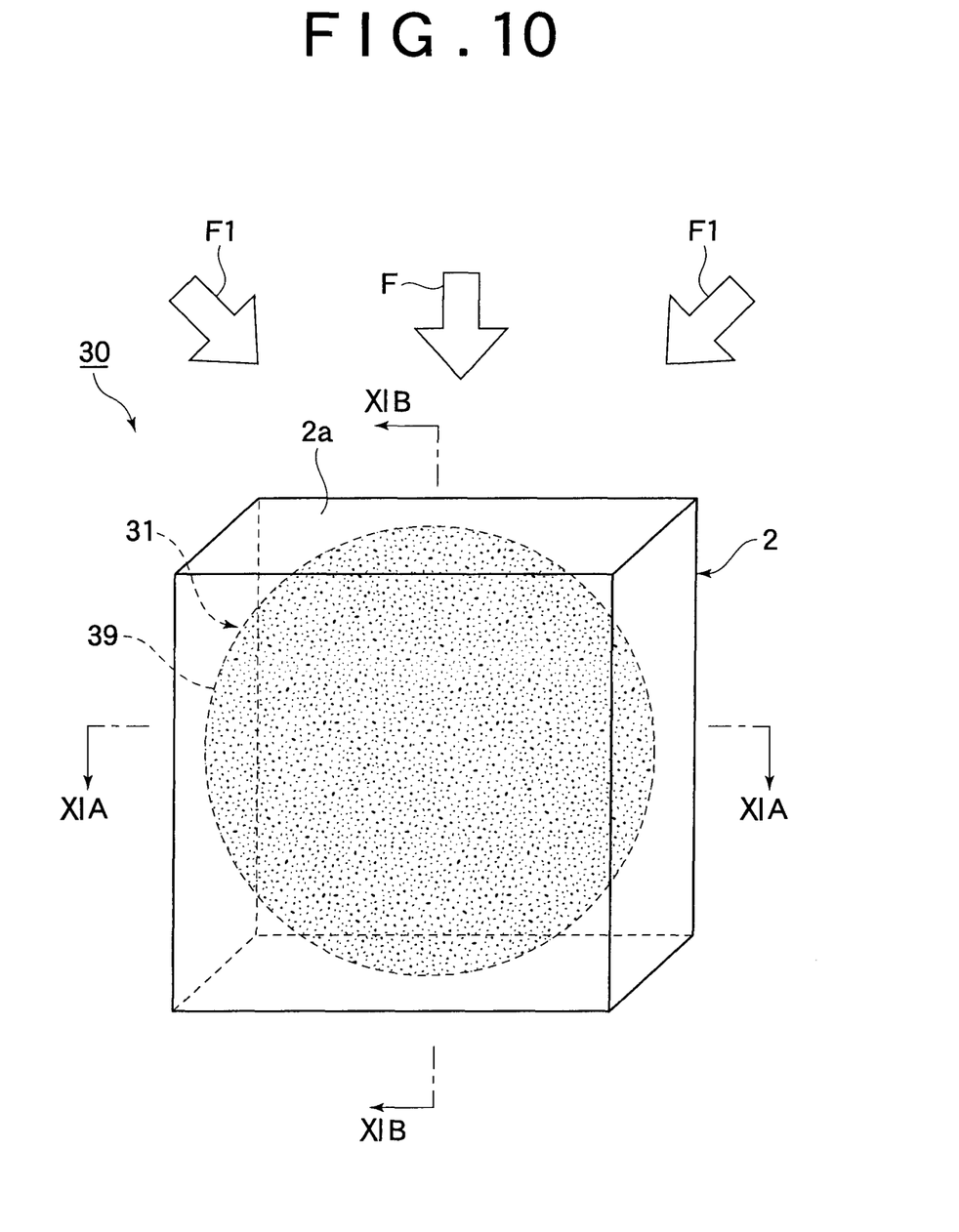
FIG. 10 is a schematic perspective view of a shock-absorbing structure of the third embodiment of the invention.
Figure 11A:
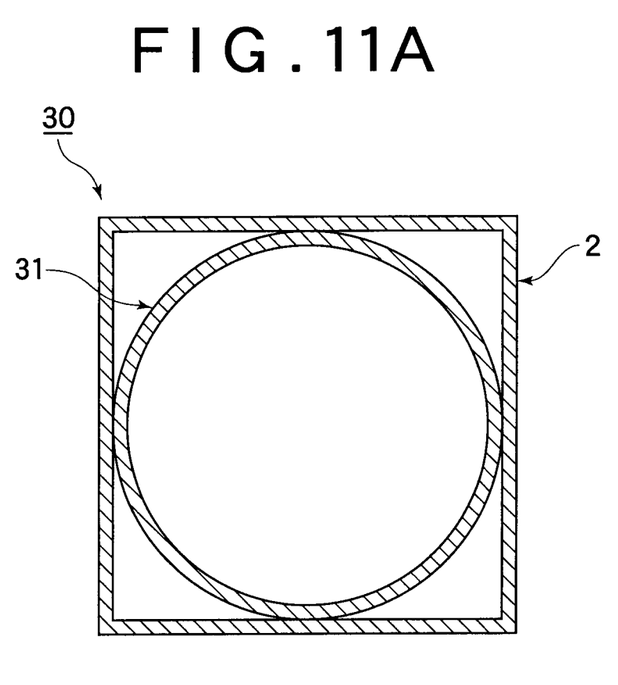
FIG. 11A is a cross-sectional view along the XIA-XIA line in FIG. 10.
Figure 11B:
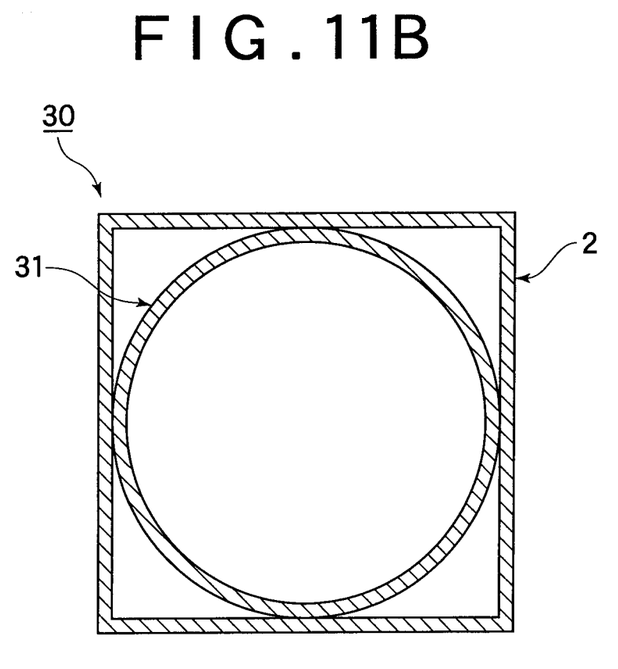
FIG. 11B is a cross-sectional view along the XIB-XIB line in FIG. 10.

FIG. 10 is a schematic perspective view of a shock-absorbing structure of the third embodiment of the invention. FIGS. 11A and 11B are cross-sectional views of the shock-absorbing structure shown in FIG. 10. As shown in FIGS. 10 to 11B, a shock-absorbing structure 30 of the present embodiment differs from the above-described shock-absorbing structure 1 in that a second steric portion 31 of a spherical outer shape is provided, instead of the second steric portion 4, so as to be in internal contact with a first steric portion 2 (see FIG. 1).

In the shock-absorbing structure 30 of the present embodiment, the second steric portion 31 is also provided inside the first steric portion 2 and a wall portion 39 of the second steric portion 31 extends along the direction crossing the specific direction. Therefore, the effect similar to the above described effect is demonstrated. Thus, the structure has high robustness in the load direction of the impact loads F, F1 that are to be absorbed and the absorption of the impact loads F, F1 is controlled.

Further, because the second steric portion 31 of the present embodiment has a spherical shape, the impact loads F, F1 from any direction can be received in the same manner. Therefore, the wall portion 39 of the second steric portion 31 can absorb the impact loads F, F1 from multiple directions including the specific direction and a higher robustness in the load direction can be demonstrated.

Figure 12:
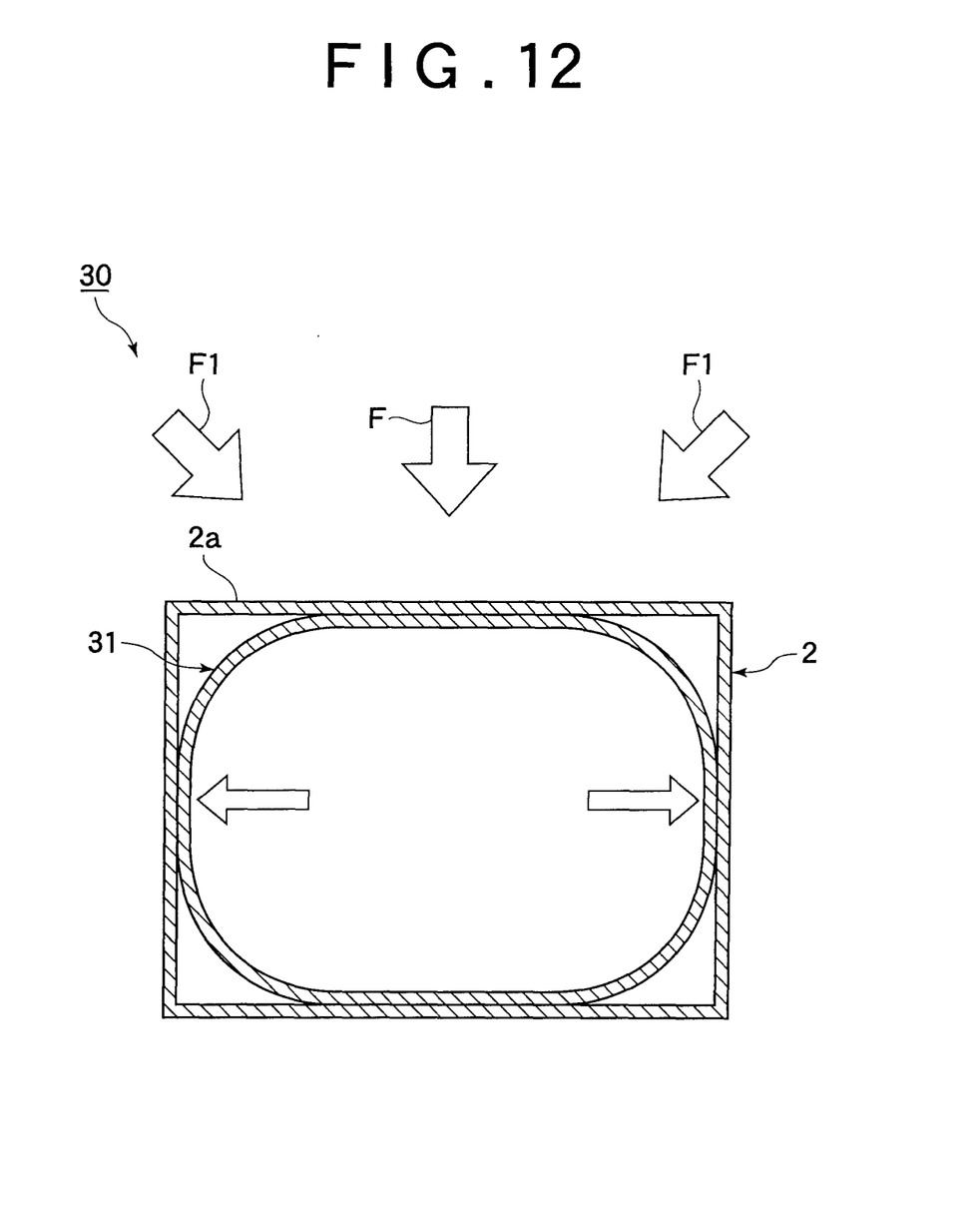
FIG. 12 is a cross-sectional view along the XIB-XIB line in FIG. 10 at a time when an impact load is applied to the shock-absorbing structure shown in FIG. 10.

In addition, in the present embodiment, as shown in FIG. 12, second steric portion 31 is deformed so as to be crushed when the impact loads F, F1 are applied. Therefore, the load can be gradually increased as the deformation advances. In other words, the absorption of impact loads F, F1 can be better controlled.

Figure 13:
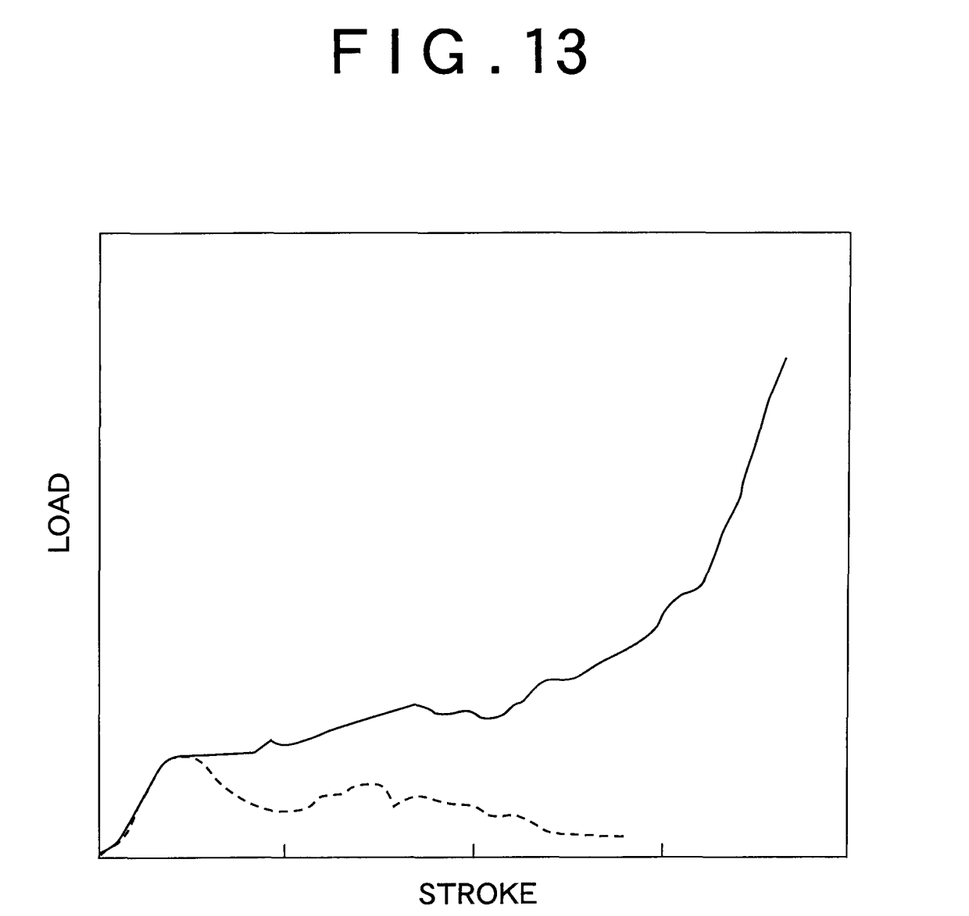
FIG. 13 is a graph showing the relationship between a load and a stroke in a case where an impact load is applied to the shock-absorbing structure shown in FIG. 10.

FIG. 13 is a graph showing the relationship between a load and a stroke in a case where an impact load is applied to the shock-absorbing structure shown in FIG. 10. In the figure, a solid line shows values relating to the above-described shock-absorbing structure 30, and a broken line shows values relating to the shock-absorbing structure according to the related art that does not include the second steric portion 31. The graph shown in FIG. 13 demonstrates that in the shock-absorbing structure 30, the load rises as the stroke increases over that in the conventional structure, more specifically the load rises as a quadratic function of increasing stroke. Therefore, the above-described effect of gradually raising the load and gradually increasing the impact absorption amount can be confirmed.

In the present embodiment, similarly to the manufacturing method explained in the first embodiment, the shock-absorbing structure can be manufactured by winding a CFRP base material about core members divided so as to obtain a necessary outer shape, stacking, and curing.

Figure 14A:
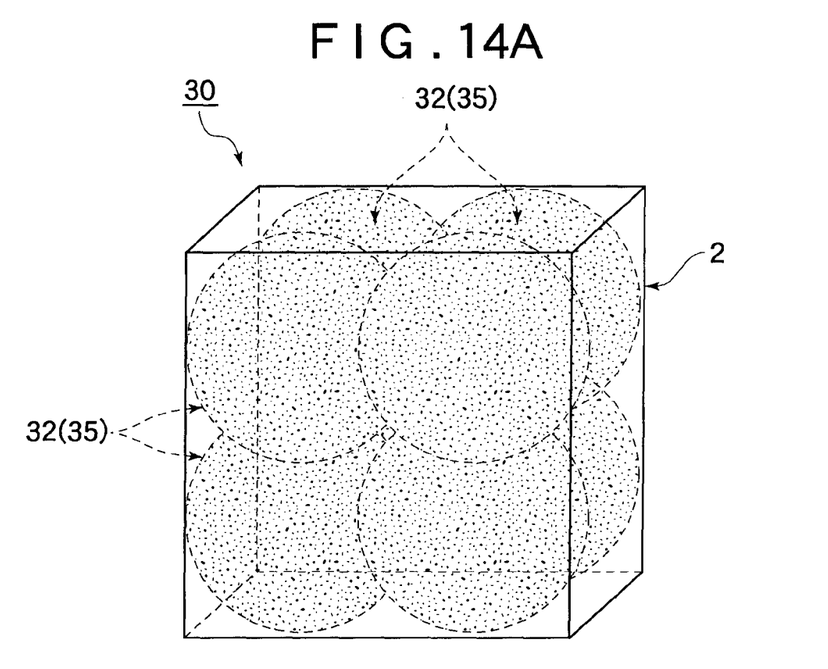
FIGS. 14A and 14B are schematic perspective views illustrating another example of the shock-absorbing structure shown in FIG. 10.
Figure 14B:
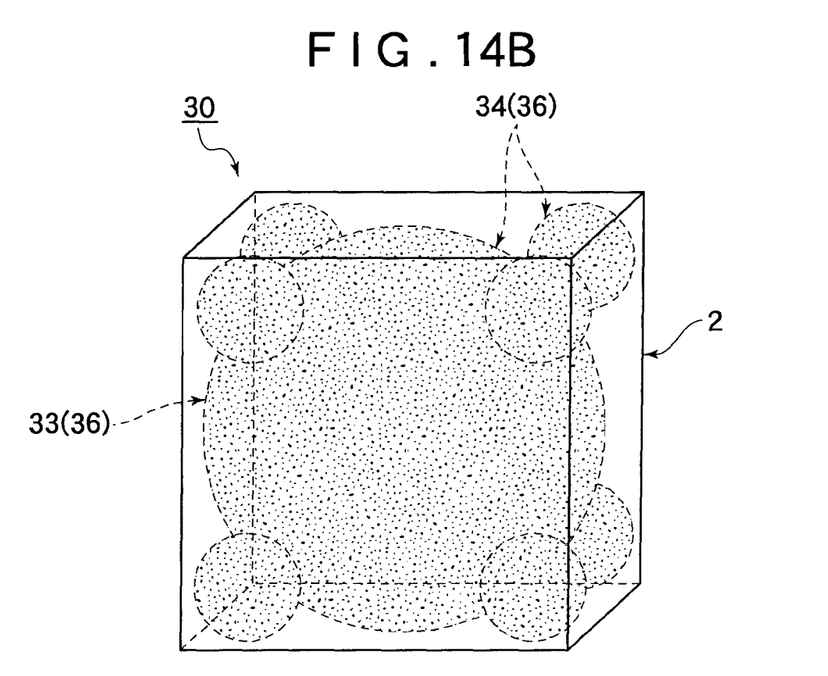

Further, in the present embodiment a second steric portion 35 configured to include a plurality of hollow spheres 32 of identical spherical outer shape may be provided, for example as shown in FIG. 14A, instead of the second steric portion 31. A second steric portion configured to increase a plurality of hollow spheres of mutually different spherical shapes may be also provided. For example, as shown in FIG. 14B, a second steric portion 36 may be provided that is configured to include a hollow sphere 33 similar to the second steric portion 31 and hollow spheres 34 that are disposed in four corners of the first steric portion 2 and in contact with the first and second steric portions 2 and 31. In this case, the number of contact points of the second steric portions 35, 36 with the first steric portion 2 is increased. Therefore, a load acting upon the second steric portions 35, 36 is easier transmitted to the first steric portion 2.

Figure 15A:
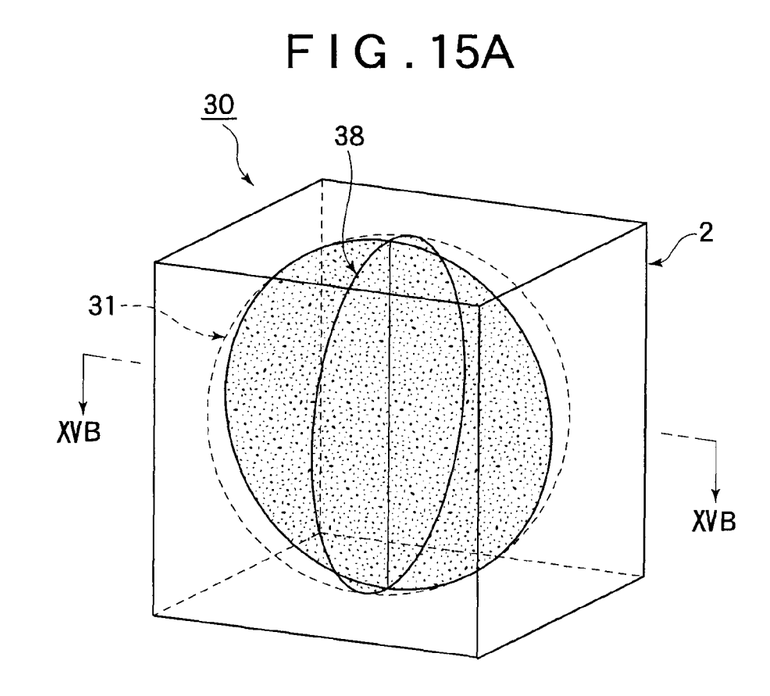
FIG. 15A is a schematic perspective view illustrating yet another example of the shock-absorbing structure shown in FIG. 10.
Figure 15B:
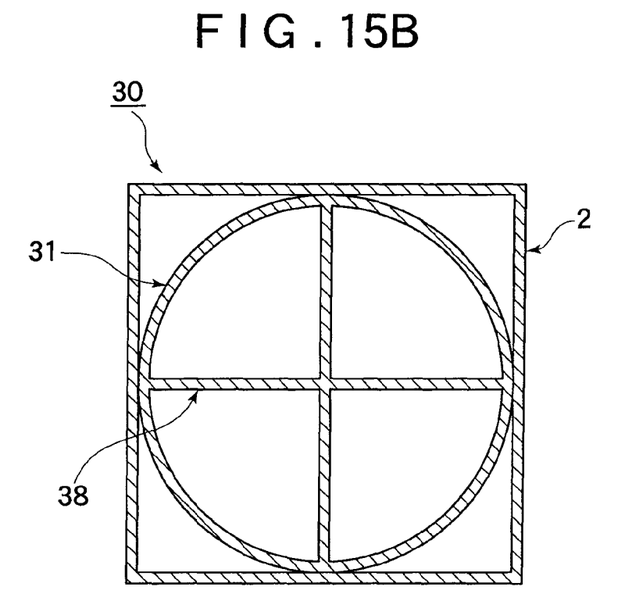
FIG. 15B is a cross-sectional view along the XVB-XVB line in FIG. 15A.

Incidentally, in the present embodiment, a reinforcing wall along the specific direction may be also provided inside the first steric portion 2 with the object of increasing the impact absorption amount. FIGS. 15A and 15B illustrate yet another example of the shock-absorbing structure shown in FIG. 10. As shown in FIGS. 15A and 15B, a cross-shaped reinforcing wall 38 such that divides the second steric portion 31 into four equal portions may be provided inside the second steric portion 31.

In the shock-absorbing structure of the above-described embodiment of the invention, a double-wall structure is obtained in which the second steric portion is provided inside the first steric portion, and the wall portion of the second steric portion can absorb not only an impact load in a specific direction, as the conventional cylindrical structure, but also impact loads in multiple directions including the specific direction. Therefore, high robustness can be demonstrated in the load direction of the impact load. In addition, a load acting upon the shock-absorbing structure (referred to hereinbelow simply as "load") can be dispersed by the second steric portion and the absorption of the impact load can be controlled.

Further, the second steric portion may be configured so that the cross section area thereof in a plane crossing the specific direction changes from one side to the other side in the specific direction. In this case, the cross section area in a plane crossing the specific direction changes with the advance of self-collapse caused by the impact load. Therefore, the load can be changed gradually. In other words, the absorption of the impact load can be further controlled.

More specifically, in this case, the second steric portion may have a pyramidal outer shape, a truncated pyramidal outer shape, or a spherical segment outer shape that has a plane crossing the specific direction as a base plane.

The second steric portion may also have a spherical outer shape. In this case, because the second steric portion has a spherical outer shape, the wall portion thereof can absorb impact loads in multiple directions including the specific direction and even higher robustness in the load direction can be demonstrated. In addition, the second steric portion having a spherical outer shape is deformed so as to be crushed when the impact load is applied. Therefore, the load can be gradually increased as the deformation advances. In other words, the absorption of impact loads can be better controlled. The above-described configuration can have high robustness in the load direction of the impact load to be absorbed and the absorption of the impact load can be controlled.

The invention is not limited to the above-described embodiments. For example, in the present embodiments, the shock-absorbing structure is made from a CFRP, but it may be also formed from other Fiber Reinforced Plastics (FRP) or metals. Further, in the embodiments, the first steric portion 2 has a polyhedral structure, but any hollow steric (three-dimensional), e.g. a spherical structure, may be used.

While some embodiments of the invention have been illustrated above, it is to be understood that the invention is not limited to details of the illustrated embodiments, but may be embodied with various changes, modifications or improvements, which may occur to those skilled in the art, without departing from the scope of the invention.

What is claimed is:

1. A shock-absorbing structure configured to absorb an impact load in a specific direction, comprising:
   a first steric portion having a hollow steric structure; and
   a second steric portion disposed inside the first steric portion and having a hollow steric structure, wherein
   the second steric portion includes a wall portion along a direction crossing the specific direction, and
   the second steric portion has a spherical outer shape.

2. The shock-absorbing structure according to claim 1, wherein the second steric portion is configured so that a cross section area thereof in a plane crossing the specific direction changes from one side to the other side in the specific direction.

3. The shock-absorbing structure according to claim 2, wherein the second steric portion has a pyramidal outer shape, a truncated pyramidal outer shape, or a spherical segment outer shape that has a plane crossing the specific direction as a base plane.

4. The shock-absorbing structure according to claim 1, wherein the first steric portion has a rectangular parallelepiped shape including two planes perpendicular to the specific direction, and the wall portion extends so as to divide the first steric portion along a diagonal from one plane to the other plane, from among the two planes.

5. The shock-absorbing structure according to claim 1, wherein the shock-absorbing structure is made from a CFRP.

* * * * *